Nov. 2, 1971 — T. H. BURGESS — 3,616,693
SWIRL-TYPE FLOWMETER
Filed June 16, 1969 — 3 Sheets-Sheet 1
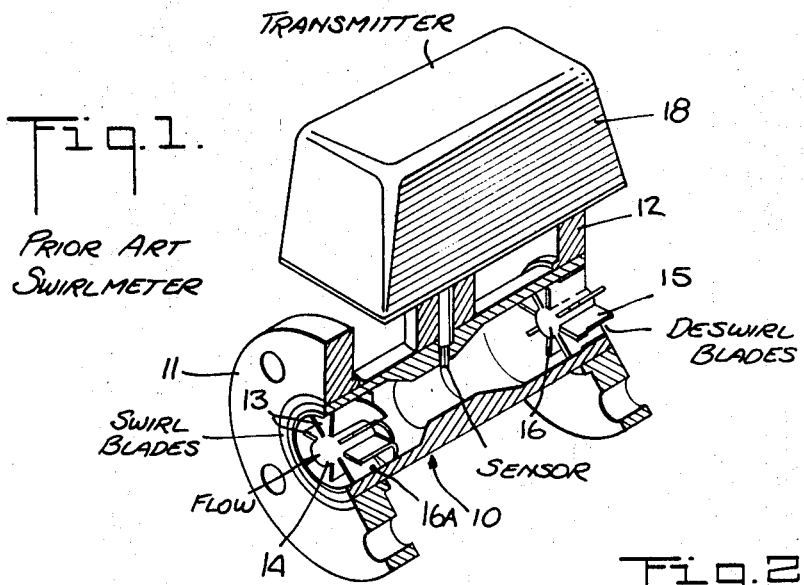
Fig. 1. PRIOR ART SWIRLMETER
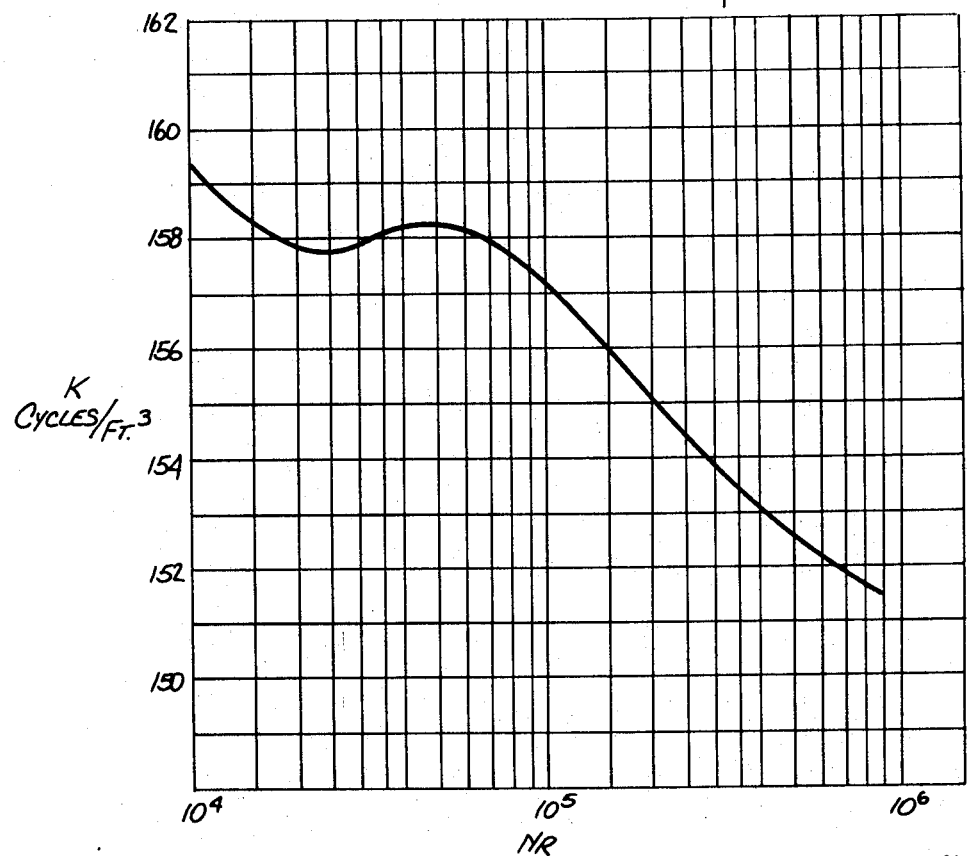
Fig. 2.
INVENTOR.
THOMAS H. BURGESS
BY
ATTORNEY Nov. 2, 1971  T. H. BURGESS  3,616,693
SWIRL-TYPE FLOWMETER
Filed June 16, 1969  3 Sheets-Sheet 2

INVENTOR.
THOMAS H. BURGESS
BY
ATTORNEY

United States Patent Office 3,616,693
Patented Nov. 2, 1971

3,616,693
SWIRL-TYPE FLOWMETER
Thomas H. Burgess, Horsham, Pa., assignor to Fischer & Porter Co., Warminster, Pa.
Filed June 16, 1969, Ser. No. 833,449
Int. Cl. G01f 1/00
U.S. Cl. 73—194 C     10 Claims

ABSTRACT OF THE DISCLOSURE

A swirl-type flowmeter whose output frequency is a function of fluid-flow rate, the frequency being substantially linear throughout a broad Reynolds number range. The meter includes a flow tube whose inlet section has a set of fixed swirl blades therein which impart a swirling motion to incoming fluid, the swirling flow being caused to precess in an enlarging section of the tube. The precessional motion is detected to produce voltage pulses whose frequency depends on flow rate. To maintain the desired linear relationship between flow rate and frequency, the geometry of the swirl blades and the inlet section associated therewith is made such as to accelerate flow therethrough to minimize boundary-layer separation along the surface of the blades.

BACKGROUND OF INVENTION

This invention relates generally to swirl-type flowmeters, and in particular to a flowmeter whose output frequency bears a substantially linear relationship to flow rate throughout a broad Reynolds number range.

A new type of volumetric flowmeter is disclosed in the article of Rodely et al., entitled "A Digital Flowmeter Without Parts," published in 1965 by the American Society of Mechanical Engineers (Apr. 8, 1965—WA/FM6).

This flowmeter which is of the swirl type is now known commercially under the trademark "Swirlmeter." Meters of this type are also described in Patents 3,279,251; 3,314,289, and Re. 26,410, among others.

In a Swirlmeter, a homogeneous fluid whose flow rate is to be measured, is forced to assume a swirl component by converting pressure energy into kinetic energy. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section. Precession takes place about the central axis of the flow tube at a discrete frequency that is a function of the volumetric flow rate. De-swirl blades in the outlet section of the flow tube serve to straighten out the fluid leaving the meter. Cyclic variations in local fluid velocity, occurring by reason of precession, are detected to provide electrical pulses whose frequency is measured to provide an indication of flow rate.

The major problem encountered in a Swirlmeter of the type heretofore known, is in obtaining a frequency output which is linearly related to mean axial velocity over a broad range of Reynolds numbers. To facilitate comparison, the Reynolds number used throughout this specification is based on the velocity, viscosity and diameter at the entrance to the meter. For example, in a typical Swirlmeter constructed in accordance with the teachings of Patent Re. 26,410, it has been found that linearity is within a tolerance of ±1% only over a relatively short Reynolds number range of 15,000 to 200,000. From the practical standpoint, this is a serious disadvantage and severely limits the utility of the meter, because mass flow-rates and pipe sizes of commercial interest result in Reynolds numbers well in excess of 200,000.

A Swirlmeter, when operated in its linear range, has a calibration factor which is not influenced by changes in the density, pressure, temperature or viscosity of the flowing fluid. Hence a meter having a relatively narrow linear range cannot be relied on for volumetric flow measurement, for outside of this range the meter reading is affected by factors other than flow rate and accurate readings are not obtainable.

BRIEF DESCRIPTION OF INVENTION

In view of the foregoing, it is the main object of this invention to provide a swirl-type flowmeter having a substantially constant ratio of precessional frequency to volumetric flow rate (hereinafter called the calibration factor) over a relatively broad Reynolds number range.

More specifically, it is an object of the invention to provide a flowmeter of the above type, having a total non-linearity of ±1% over a Reynolds number range of $10^4$ to at least $2\times 10^6$.

Still another object of the invention is to provide a swirl-type flowmeter having an extended linear range wherein the geometry of the swirl blades and of the associated inlet section of the meter is such as to minimize deceleration of the boundary layer in the swirl blades, thereby obviating boundary-layer separation effects giving rise to a non-linear response.

Briefly stated, these objects are attained in one embodiment of a swirl-type flowmeter wherein an array of fixed swirl blades is mounted within the inlet section of the flow tube to impart a swirling motion to incoming fluid, the swirling flow being caused to precess in a downstream enlarging section of the tube.

To maintain a substantially linear relationship between the precessional frequency and flow rate, the outside diameter of the swirl-blade array is tapered in the downstream direction, and the passage through the inlet section is formed with a complementary taper to progressively reduce the cross-sectional area of the flow passage as the flow of fluid is caused to turn, thereby accelerating the main flow and the boundary-layer and preventing separation along the surfaces of the blades thereby improving the constancy of the calibration factor.

BRIEF DESCRIPTION OF DRAWING

For a better understanding of the invention as well as other objects and further features thereof, reference is made to the following detailed description to be read in conjuction with the accompanying drawings, wherein:

FIG. 1 is a perspective view, partly in section, of a prior-art swirl-type flowmeter;

FIG. 2 is a typical calibration curve obtained with a prior-art flowmeter;

DESCRIPTION OF INVENTION

Figure 3:
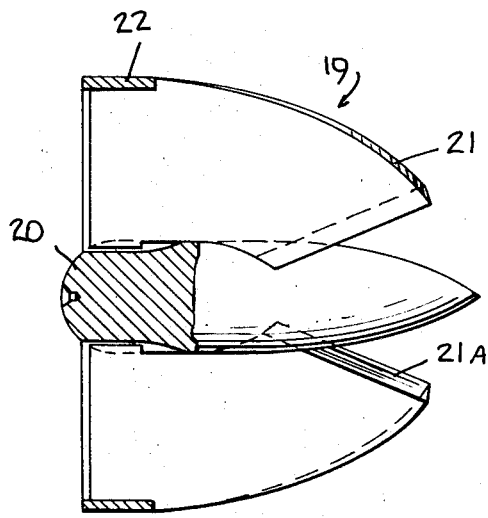
FIG. 3 shows the swirl-blade assembly of a swirl-type meter in accordance with the invention, in side elevation.

In order to afford a basis for comparison with the present invention, FIG. 1 shows an existing "Swirlmeter" whose aerodynamic structure gives rise to nonlinearity of calibration factor. This prior-art flowmeter includes a meter body constituted by a flow conduit or tube 10 having mounting flanges 11 and 12 at either end to facilitate the interposition of the meter in a line whose fluid is to be metered. The fluid may be any homogeneous fluid or gas.

Flow tube 10 comprises a cylindrical inlet section 10A, a cylindrical outlet section 10B, and a Venturi section 10C interconnecting the inlet and outlet sections. The inlet and outlet sections have internal diameters of corresponding size, which are uniform throughout, whereas Venturi section 10C is formed with a throat entrance region of decreasing cross-sectional area extending downstream from inlet section 10A to a constricted or throat region which leads to a flaring or throat exit region of increasing cross-sectional area communicating with outlet section 10B. Thus the Venturi serves to constrict the flow coming from the inlet section and to expand flow in advance of the outlet section.

Mounted within inlet section 10A is a fixed array of curved swirl blades 13 radiating from a hub 14. The outside diameter of the blade array is uniform throughout its length and matches the internal diameter of inlet section 10A. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array swirl blades to assume a swirling motion, the swirling fluid being directed into Venturi section 10C. In the flaring exit region of the Venturi where the increasing area gives rise to fluid expansion, the swirling flow is converted into precessional motion about the longitudinal axis of the tube. The frequency of precession depends on the volumetric flow rate. This crucial relationship is analyzed later in greater detail.

To straighten out the flow leaving the meter, a set of planar de-swirl blades 15, extending radially from a hub 16, is fixedly disposed in the outlet section 10B.

Cyclic variations in local fluid velocity as a result of the precessional motion are detected by a sensor 17. In practice, sensor 17 may take the form of a thermistor whose resistance value is varied periodically in response to temperature changes produced by the precessing fluid. Voltage pulses are derived from the thermistor, these pulses being amplified and filtered, and being converted into square-wave pulses of constant amplitude. The frequency of the square-wave pulses may be measured by a conventional electronic counter, or the signals generated by the meter may be precessed by other digital readout or control instrumentation.

The electronic circuits operating in conjunction with sensor 17 are contained in a casing 18 mounted on the meter body. The sensor and the electronic circuits are not the concern of the present invention, and are disclosed only in order to explain the behavior of the Swirlmeter and how flow is converted into digital values.

It has been found that a swirl-type meter of the prior art (FIG. 1), wherein the outside diameter of the array of swirl blades is uniform throughout the length of the blades and matches the internal diameter of the cylindrical inlet section, affords a non-linear relationship between flow rate and output frequency over the Reynolds number range of greatest practical interest.

A typical curve indicative of this non-linear relationship is shown in FIG. 2, where for a meter having a three-inch pipe diameter, Reynolds numbers in the range of $10^4$ to $10^6$ are plotted on a semi-logarithmic scale against calibration factor in the range of 148 to 162 cycles/ft.$^3$. The maximum Reynolds number range for $\pm 1\%$ linearity is approximately 13.1, and the total non-linearity over the Reynolds number range of $10^4$ to $10^6$ is approximately 5%. This significant lack of linearity is a serious drawback and precludes the use of the Swirlmeter in many applications calling for reasonably accurate flow-rate readings.

Before considering how the present invention achieves a linear relationship between flow rate and frequency over a broad range of Reynolds numbers, it would be best to first take up certain factors which come into play. In analyzing the fundamental behavior of a swirl-type meter, the first factor of importance is the tangential velocity component of motion. In a Swirlmeter, the incoming axial velocity profile is given a tangential velocity component by the curved swirl blades.

The second factor is precessional motion, for the enlarging section in the flow tube causes the applied swirling fluid to precess about the longitudinal axis of the tube. In order to obtain a linear output, the frequency of precession must be directly proportioned to flow rate.

The above-cited article of Rodely et al. points out that the frequency of precession is linearly related to the tangential velocity component. From this it follows that in order to obtain a linear relationship between flow rate and output frequency, it is vital that a constant ratio of the tangential to the axial velocity flow component be maintained over the meter cross-section as a function of Reynolds numbers.

In terms of the design of the swirl blades, to obtain a constant ratio of tangential to axial-flow component requires that the flow from the trailing portion of the blades be at a constant angle independent of Reynolds number. This requirement does not dictate a condition under which the flow leaves all portions of the blade cross-section at the same angle, but only that the angle at any exit point be constant with Reynolds number.

The concept of flow departure from the swirl blades at an angle independent of Reynolds number implies that the fluid boundary layer follows the blade surface either without separation or with separation at a constant angle independent of Reynolds number.

The viscosity effects of a real fluid are most pronounced at or near a solid boundary, and diminish rapidly with distance therefrom. Control of the boundary layer itself is critical, for the boundary layer is the region in the flow where all of the viscous effects of the fluid are concentrated. Small changes in this layer produce large changes in the main flow.

As pointed out previously, in order to provide a strong signal and a high information rate, the swirl blades are designed to normally deflect the flow through a significant angle with respect to the longitudinal axis of the pipe. With this large bend angle, the boundary layer along the rear edge would normally be expected to become thicker and to decelerate as it becomes further removed from the leading edge until at some stagnation point the velocity gradient normal to the wall $\delta v/\delta y$ is zero.

This stagnation point is, by definition, the point of separation. A more detailed analysis of the phenomenon of boundary-layer separation may be found in the text, "Boundary Layer Theory," by Schlichting, published in 1962 by McGraw-Hill. Such separation occurs whether the velocity distribution in the boundary layer is laminar or turbulent, except that in the laminar condition, separation will occur nearer the leading edge of the air foil or blade.

In order, therefore, to extend the linear range of the meter, the parameters of blade design must be such as to create a boundary layer in which separation along the blade does not occur within the prescribed range of Reynolds numbers. Before analyzing the unique solution to this problem devised by applicant, it may be best to review briefly various conventional approaches to the problem of boundary-layer separation.

The above-cited Schlichting text lists four general methods for controlling boundary layer separation; namely (a) shaping of the airfoil to prevent transition to turbulent flow, (b) motion of the solid boundary, (c) suction, and (d) acceleration of the boundary layer.

None of these approaches is feasible in connection with the curved swirl blades in a swirl-type meter. The desired turning angle and the prescribed Reynolds number range are too great to prevent separation with a practical airfoil design. Inasmuch as the absence of moving parts is a significant feature of the swirl-type meter, this precludes movement of the blades to effect motion of the solid boundary avoiding separation. The use of suction slots to remove the decelerated boundary layer is also impractical, due to the over-all blade size as well as clogging problems and problems encountered in maintaining the requisite suction flow rates.

Finally, acceleration of the boundary layer by supplying additional energy to the particles of the fluid being retarded, introduces problems similar to those arising with suction and is impractical in the context of Swirlmeters.

It has been discovered that the linear frequency range of a swirlmeter can be extended to be within $\pm 1\%$ over a Reynolds number range of $10^4$ to at least $2 \times 10^6$, by progressively reducing the area of the flow passage through the inlet section of the tube as the flow is being turned by the array of curved swirl-blades therein, thereby accelerating the main flow and the boundary layer along the blades and preventing boundary-layer separation adjacent the trailing edges of the blades. Thus acceleration effects produced by progressive area reduction of the flow passages between the blades act to offset deceleration and to retard boundary-layer separation.

Figure 4:
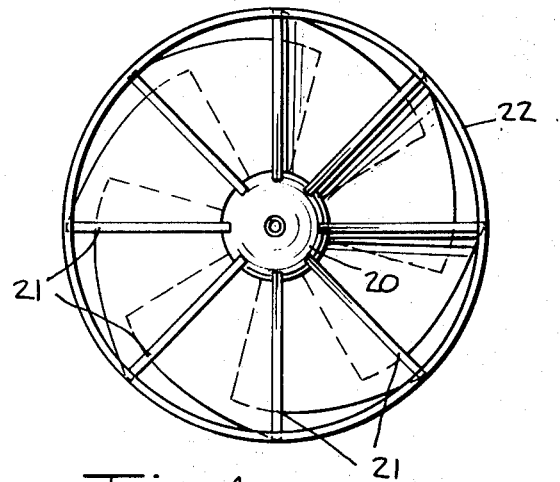
FIG. 4 is a front view of the blade assembly.
Figure 5:
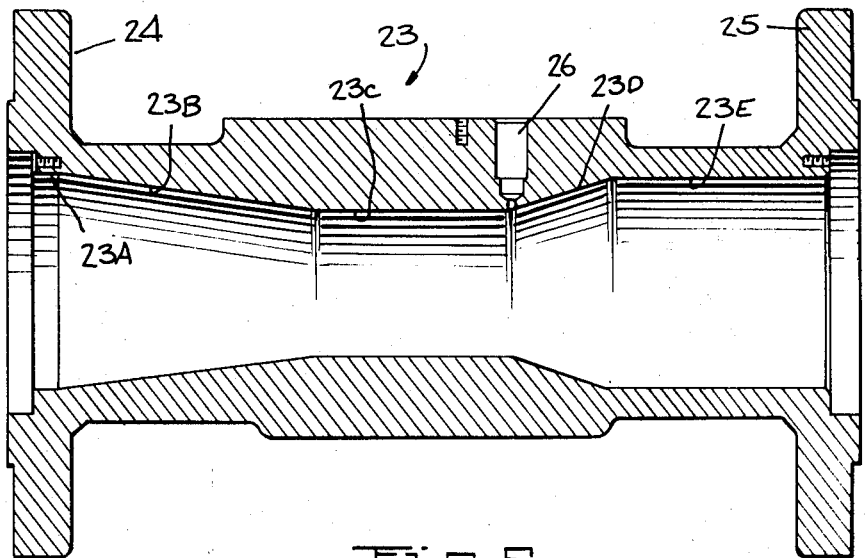
FIG. 5 is a longitudinal section taken through the meter body of the meter, in accordance with the invention.
Figure 6:
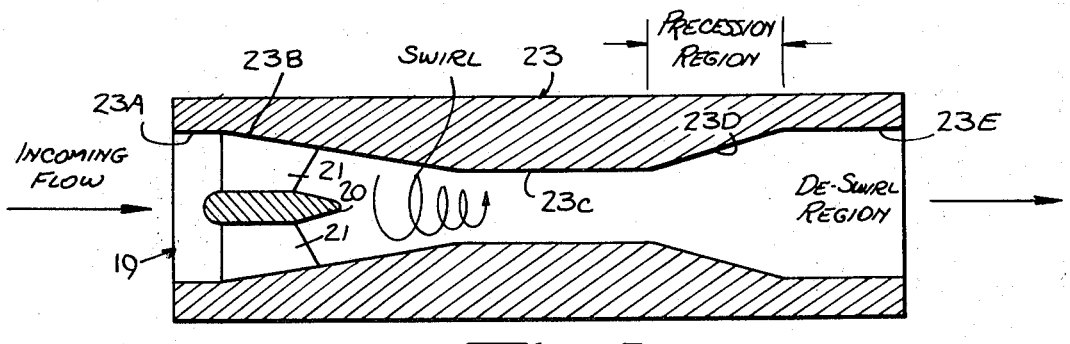
FIG. 6 schematically shows the combination of swirl-blade assembly and meter body.

Referring now to FIGS. 3 and 4, the structure of a set of swirl blades in accordance with the invention is illustrated, the set being generally indicated by numeral 19. The set consists of a streamlined hub 20 to which is attached an array of blades 21, the leading edges of the blades being integral with a cylindrical ring 22. The trailing edge 21A of each blade is feathered.

The leading edges of blades 21 extend radially from hub 20 at equi-spaced circumferential positions, the blades then curving to define flow passages which cause the incoming fluid to turn, thereby producing a swirling motion.

The diameter of ring 21 is uniform, whereas the diameter of the array of blades from the rear of the ring to the trailing edges of the blades diminishes progressively. The tapered set of swirl blades is received in the inlet section of a flow tube 23 having mounting flanges 24 and 25 on either end. The inlet section includes a cylindrical region 23A to accommodate ring 22, and a tapered region 23B whose taper complements the taper of the swirl blades 21 received therein.

In prior-art constructions of the type exemplified in FIG. 1, the Venturi section has a throat entrance region distinct from the inlet section of the flow tube. In the present invention, the tapered inlet section 23B also constitutes the throat entrance region of a Venturi section which includes a constricted throat region 23C and an expansion or flaring region 23D leading to an outlet section 23E adapted to accommodate a set of de-swirl blades (not shown). A suitable sensor is mounted in the lateral bore 26 communicating with the flaring region 23D to detect precessional flow to produce output pulses.

Figure 7:
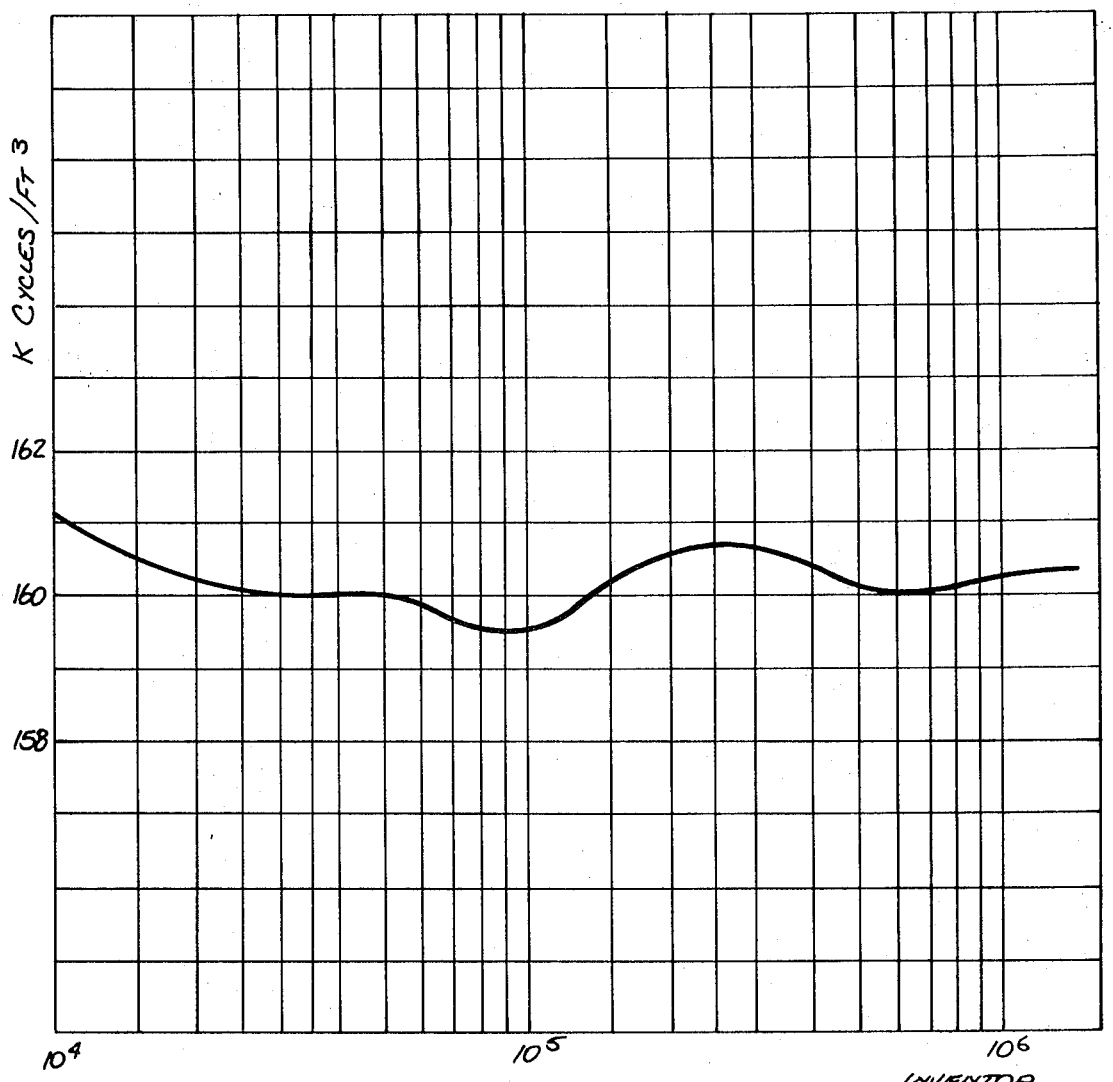
FIG. 7 shows a calibration curve obtained with the present invention.

Thus, as shown schematically in FIG. 7, incoming homogeneous fluid entering inlet section 23A–23B is subjected to the action of swirl blades 21, and as the flow is turned thereby, it is concurrently forced through tapered passages between the blades whose overall cross-sectional area progressively diminishes in the downstream direction, thereby accelerating the flow therethrough to prevent or minimize boundary-layer separation at the trailing edges of the blades.

In this way, a substantially constant ratio is maintained between the tangential velocity component of the swirling fluid and the axial component thereof as a function of Reynolds numbers. As a consequence, as demonstrated by the graph in FIG. 7, which is a plot based on an actual embodiment of a Swirlmeter having tapered swirl blades, a substantially constant calibration factor relationship exists over Reynolds numbers in a range of $10^4$ to $10^6$.

From a comparison of the graphs in FIGS. 2 and 7, the marked improvement obtained by the use of a tapered structure as against an untapered structure will be immediately evident. Thus a swirl-type meter in accordance with the invention is of significant practical value, for it has no moving parts and affords accurate readings of flow rate over a broad range of Reynolds numbers.

While the outside diameter of the swirl blade array has been chosen as the most convenient parameter to be manipulated to avoid boundary-layer separation, similar results can be achieved, based on the concept underlying the invention, by tapering the diameter of the hub 20, or by progressively increasing the thickness of the blades from the leading to the trailing edge, so as to progressively diminish the overall area of the flow passages as the fluid is turned by the blades.

The performance shown by FIG. 7 has deliberately been described in terms of the dimensionless Reynolds number, as it then may be applied to any inlet or swirl-blade size using the principle of dynamic similarity, as explained on page 12 of the Schlichting text, previously identified. In actual practice, the present size range, determined by existing manufacturing considerations, is 1 to 6 inches. This is approximately the inlet or exist dimension D, with a throat diameter of .7D, a total taper length of approximately 2.2D and a total meter length of approximately 4D.

While there has been shown and described a preferred embodiment of swirl-type flowmeter in accordance with the invention, it will be appreciated that many changes and modifications may be made therein without, however, departing from the essential spirit of the invention.

What I claim is:

1. A swirl-type flowmeter for producing an output frequency which bears a substantially linear relationship to flow rate throughout a broad range of Reynolds numbers, said flowmeter comprising:
    (A) a flow tube having an inlet section to receive an incoming fluid whose flow rate is to be measured and an expansion region at a downstream position in said tube, and
    (B) a set for curved swirl blades disposed in said inlet section to define curved passages imparting a turning motion to fluid flow therethrough to create a swirling fluid, which in the expansion region is caused to undergo precessional motion at a frequency which is a function of flow rate, the geometry of said blades and inlet section defining curved passages of progressively diminishing area in the downstream direction to accelerate the flow therethrough to an extent minimizing boundary-layer separation, whereby said frequency is substantially proportional to flow rate in said range.

2. A flowmeter as set forth in claim 1, wherein said passages of progressively diminishing area are defined by swirl blades having a tapered outside diameter disposed in an inlet section having a complementary taper.

3. A flowmeter as set forth in claim 1, wherein said set of blades is mounted on an elongated central hub of progressively increasing diameter in the downstream direction to define said passages of progressively diminishing area.

4. A flowmeter as set forth in claim 1, wherein said set of blades is formed of elements whose thickness increases progressively in the downstream direction to define passages of progressively increasing diameter.

5. A swirl-type flowmeter as set forth in claim 1, wherein, wherein said Reynolds number range extends between approximately $10^4$ and $10^6$.

6. A swirl-type flowmeter as set forth in claim 2, wherein said tube includes a Venturi section having a throat entrance region constituted by the tapered inlet section, a constricted throat region, and an expanding throat exit region defining said expansion region, precessional motion occurring in said exit region.

7. A swirl-type flowmeter as set forth in claim 6, further including means coupled to said exit section to detect said precessional motion to produce electrical pulses of the same frequency.

8. A swirl meter as set forth in claim 1, wherein said tube includes an outlet section following said Venturi section, and a set of de-swirl blades disposed in said outlet section.

9. A swirl meter as set forth in claim 1, wherein said blades deflect the fluid by an angle of at least thirty degrees.

10. In a flowmeter having a flow tube through which fluid is conducted, a set of curved swirl blades disposed in a section of said tube to impart a turning motion to fluid-flow therethrough, the geometry of said blades and said section defining curved passages of progressively diminishing area in the downstream direction to accelerate the flow therethrough to an extent minimizing boundary-layer separation.

References Cited

UNITED STATES PATENTS

| | | | |
|---|---|---|---|
| Re. 26,410 | 6/1968 | Chanaud | 73—194 |
| 3,434,344 | 3/1969 | Brunner | 73—194 |
| 3,481,196 | 12/1969 | Rodely | 73—194 |

RICHARD C. QUEISSER, Primary Examiner

C. E. SNEE, III, Assistant Examiner

UNITED STATES PATENT OFFICE
CERTIFICATE OF CORRECTION

Patent No. 3,616,693      Dated   November 2, 1971

Inventor(s)  Thomas H. Burgess

It is certified that error appears in the above-identified patent and that said Letters Patent are hereby corrected as shown below:

Column 1 , line 36, in the book-title, "Moving" should have appeared before "Parts"

Column 3 , line 27, --of-- should have appeared after "array"

Column 6, line 22, "exist" should have read -- exit --

Column 6 (in claim 1) line 40 (first line of [B]), "for" should have read -- of --

Signed and sealed this 13th day of June 1972.

(SEAL)
Attest:

EDWARD M. FLETCHER, JR.
Attesting Officer

ROBERT GOTTSCHALK
Commissioner of Patents